US010003192B2

(12) United States Patent
Geng et al.

(10) Patent No.: US 10,003,192 B2
(45) Date of Patent: Jun. 19, 2018

(54) BUS INTERFACES WITH UNPOWERED TERMINATION

(71) Applicant: NXP B.V., Eindhoven (NL)

(72) Inventors: Xueyang Geng, Chandler, AZ (US); Ahmad Yazdi, Chandler, AZ (US); Siamak Delshadpour, Phoenix, AZ (US); Abhijeet Chandrakant Kulkarni, Chandler, AZ (US)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 14/868,044

(22) Filed: Sep. 28, 2015

(65) Prior Publication Data
US 2017/0093154 A1 Mar. 30, 2017

(51) Int. Cl.
H02J 1/10 (2006.01)
H02J 3/38 (2006.01)
H02J 1/00 (2006.01)
H02M 7/04 (2006.01)

(52) U.S. Cl.
CPC ............... *H02J 1/00* (2013.01); *H02M 7/04* (2013.01)

(58) Field of Classification Search
CPC ..................... H02M 7/04; H02J 1/00
See application file for complete search history.

(56) References Cited

U.S. PATENT DOCUMENTS

| 5,313,595 A | 5/1994 | Lewis et al. |
| 5,586,271 A | 12/1996 | Parrett |
| 5,939,937 A * | 8/1999 | Terletzki ........ H03K 19/018521 327/437 |
| 6,192,433 B1 | 2/2001 | Chan et al. |
| 6,567,877 B1 | 5/2003 | Lewis et al. |
| 7,522,659 B2 * | 4/2009 | Lacy .................... G06F 13/4072 326/83 |
| 7,525,291 B1 * | 4/2009 | Ferguson ............. H02J 7/0021 320/128 |
| 8,842,110 B2 * | 9/2014 | Kim ..................... G09G 3/3233 345/211 |
| 2002/0122389 A1 * | 9/2002 | Kobayashi ............. H04L 12/28 370/250 |

(Continued)

OTHER PUBLICATIONS

"Universal Serial Bus Type-C Cable and Connector Specification" Revision 1.1 USB 3.0 Promoter group: Hewlett-Packard Company, Intel Corporation, Microsoft Corporation, Renesas, STMicroelectronics and Texas Instruments, Apr. 3, 2015.

(Continued)

*Primary Examiner* — Jared Fureman
*Assistant Examiner* — Esayas Yeshaw

(57) ABSTRACT

A system including a device that is configured to communicate current sourcing capabilities to an external power source over a wired connection containing a plurality of wires. The device includes a power supply circuit configured to provide operating power for the device. A first pull-down circuit is configured to provide a pull-down for a particular wire of the wired connection using a first resistive element that is actively trimmed using the operating power. A second pull-down circuit includes at least one transistor that, in the absence of the operating power, is configured to enable a current path, in response to a gate voltage generated from a voltage on the particular wire, between the particular wire and a second resistive element.

19 Claims, 6 Drawing Sheets

(56) References Cited

U.S. PATENT DOCUMENTS

2013/0179603 A1* 7/2013 Tu .......................... G06F 13/00
                                                710/15
2014/0334200 A1* 11/2014 Chui ..................... H02H 7/222
                                                363/49
2015/0326019 A1* 11/2015 Wei .................. H01L 31/02021
                                                307/80
2016/0268892 A1* 9/2016 Gupta .................... H02M 3/07

OTHER PUBLICATIONS

Extended European Search Report for application 16188486.1; 5 pages (Jan. 3, 2017).

* cited by examiner

BUS INTERFACES WITH UNPOWERED TERMINATION

OVERVIEW

Aspects of various embodiments are directed to communicating current sourcing capabilities to an external power source over a wired connection containing a plurality of wires.

Bus interface protocols can be designed to allow for power to be provided over wired interfaces. This power can be used, in some instances, to charge a battery, or similar self-contained power source, directly power a power-receiving (power-consuming) device, or both charge and directly power. Standards for bus interface protocols can sometimes provide for different power-sourcing capabilities between different power-consuming devices. For example, different power-consuming devices, each using the same wired interface can be configured to draw different amounts of current. Consistent with various aspects discussed herein, the power-consuming devices can be configured to communicate their power-sourcing capabilities to the power-providing device upon connection. In some instances, at least a portion of this communication may occur before a power-supply of the power-consuming device has reached a stable internal voltage.

A particular type of bus interface protocol is the Universal Serial Bus (USB). While USB can be used to attach external peripherals to a Personal Computer. It can also be used for interfacings between peripherals, charging thereof and a host of other applications and uses, such as automotive, cameras, smart phones, televisions, and set-top boxes. USB can also be used as a source of power in various mobile device charging solutions. USB provides various different data transfer speeds. For example, USB 3.0 provides data transfer speeds up to 5 Gbit/s and USB 3.1 provides data transfer rates of up to 10 Gbit/s. USB also provides various different power providing and sinking capabilities. The new USB Type-C can support 5V with 500 mA/900 mA (for USB 2.0/USB 3.1), 1.5 A and 3 A mode. The USB Power Delivery (PD) supports a power negotiation and delivery solution that supports up to 100 W (20V×5 A).

These and other matters have presented challenges to providing power between different devices and corresponding implementations, for a variety of applications.

SUMMARY

Various embodiments of the present disclosure are directed toward a system that includes a device that is configured to communicate current sourcing capabilities to an external power source over a wired connection containing a plurality of wires. The device can include a power supply circuit configured to provide operating power for the device. A first pull-down circuit can be configured to provide a pull-down for a particular wire of the wired connection using a first resistive element that is actively trimmed using the operating power. A second pull-down circuit can be configured to include at least one transistor that, in the absence of the operating power, is configured to enable a current path, in response to a gate voltage generated from a voltage on the particular wire, between the particular wire and a second resistive element.

Certain embodiments are directed toward a method for communicating current sourcing capabilities of an upstream facing device to a downstream facing device that provides external power over a wired connection containing a plurality of wires. A voltage can be received over a particular wire of the wired connection. A transistor of a first pull-down circuit can be enabled, in response to a gate voltage of the transistor that is generated from the voltage over the particular wire, to pull down the particular wire using a first resistive element. In response to a presence of power from a power supply circuit of the upstream facing device, the first pull-down circuit can be disabled. In response to the presence of power from the power supply circuit of the upstream facing device, a second pull-down circuit can be enabled. The second pull-down circuit can use a second resistive element that is actively trimmed using the power from the power supply circuit.

According to some embodiments, a device includes a wired connector including a plurality of pins. A power supply circuit is configured to provide operating power for the device. A first pull-down circuit is configured to pull down a particular wire of the wired connection using a first resistive element that is connected to a pull-down voltage and that is actively trimmed using the operating power. A second pull-down circuit includes: a first transistor having a source and a gate tied to the particular wire and drain; a second resistive element connected between the drain of the first transistor and a pull-down voltage; and a second transistor configured to disable the first transistor in response to an enable signal.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
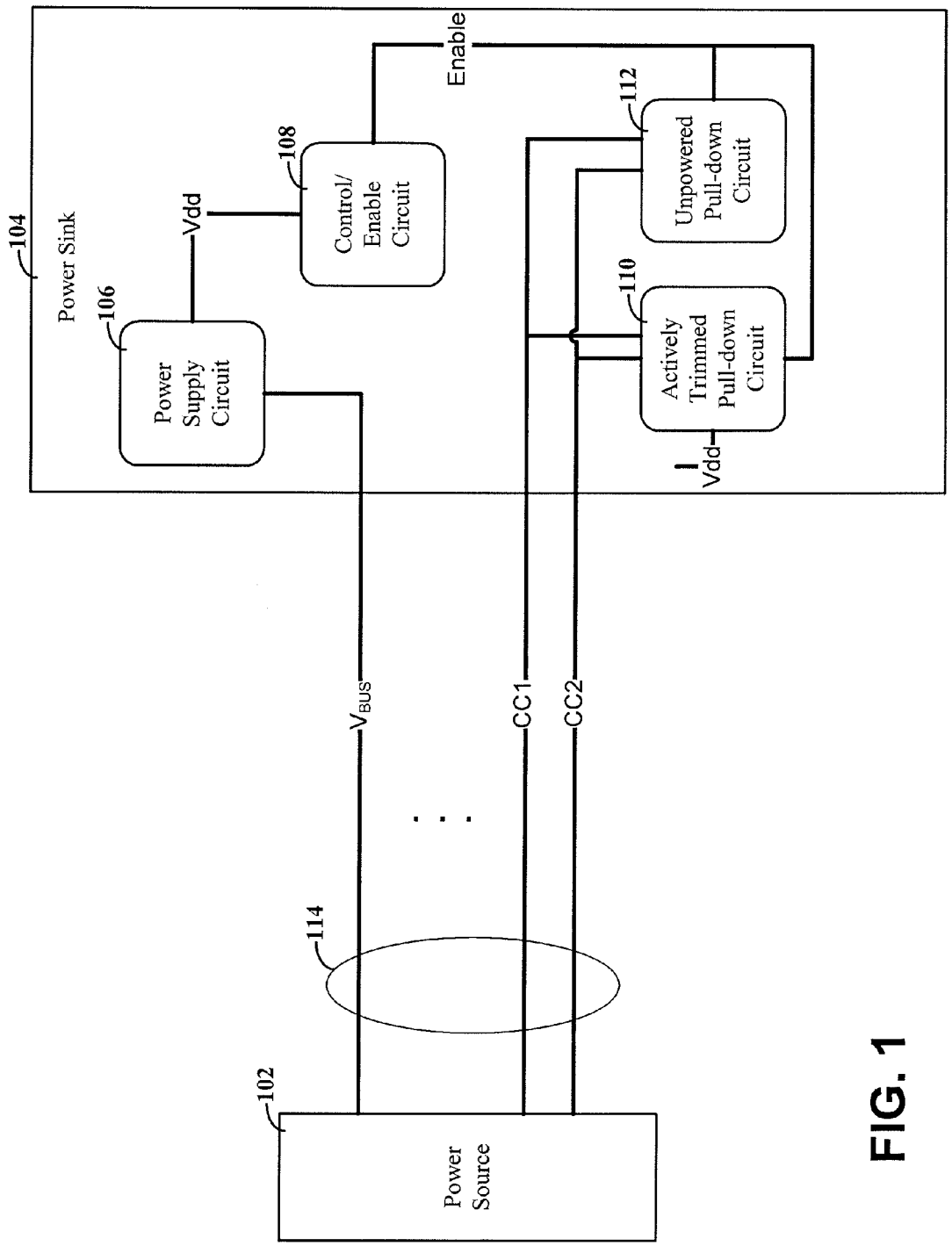
FIG. 1 depicts a block diagram of a system for communicating current sourcing capabilities between devices, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communications relating to powering devices over a communication bus interface. In certain implementations, aspects of the present disclosure have been shown to be beneficial when used in the context of a communication bus interface that uses the presence and value of resistance values to communicate power-related capabilities. In some embodiments, resistive components can be used to pull-down a wire of the communication bus interface and circuitry can be used to select different resistive components based upon the power state of a power-consuming device. These and other aspects can be implemented to address challenges, including those discussed in the background above. While not necessarily so limited, various aspects may be appreciated through a discussion of examples using such exemplary contexts.

Consistent with certain embodiments, a power-consuming device is configured to receive power over a wired connection containing a plurality of wires. The power-consuming device can be configured to use two different circuits depending upon the internal power state of the power-consuming device. Each of the circuits can provide an indication of power-sourcing capabilities of the power-consuming device. For example, the different circuits can each indicate how much current the power-consuming device is designed to source. In certain instances, this can allow for one of the two different circuits to use operating power from a power supply of the power-consuming device and the other to function in the absence of the operating power. This can be particularly useful when one of the circuits uses operating power to provide a more accurate indication. In various embodiments, each of the circuits can be selectively disabled when operating power is present. As such, the two circuits can be used in combination to provide a tiered set of indications, one of which is available earlier when, for example, a local power source is not available (e.g., a battery of the device has insufficient charge).

According to particular embodiments, a power-consuming device can be configured to provide a first pull-down resistance to a particular wire of a bus interface in the absence of local operating power. A control circuit can be configured to generate a control signal that disables the first pull-down resistance. As discussed herein, the control circuit can be configured to generate the control signal in response to the presence of (stable) operating power for the power-consuming device. The control circuit can then enable a second pull-down circuit that can use the operating power to provide a more precise pull-down resistance to the particular wire. For example, the second pull-down circuit can use active trimming to control the resistance of the pull-down. The control circuit can further be configured to disable both of the pull-down circuits.

Certain embodiments are directed toward the use of a single type of transistor technology for both of the pull-down circuits. For instance, the control of the pull-down circuits can be implemented using enhanced-mode metal-oxide-semiconductor (MOS) transistors without using depletion-mode transistors. For a variety of reasons, enhanced-mode MOS transistors tend to be favored in modern semiconductor technology relative to depletion mode MOS transistors. Moreover, some embodiments allow for the control over the pull-down circuits to be implemented with a control signal that is within the operating voltage range for the local operating power of the device. For example, an N-type metal-oxide-semiconductor (NMOS) enhanced-mode transistor can have its gate connected to the particular wire so that it is enabled in response to a voltage applied to the particular wire. This can be particularly useful for facilitating the generation of the control signal without the use of charge pumps, negative supply generators, or similar circuits.

Various embodiments are directed toward a power-consuming device that is configured for use with a Universal Serial Bus (USB) interface. For instance, this can include the use of a USB 3.1 system architecture which includes both a traditional USB 2.0 bus and an Enhanced SuperSpeed bus through USB Type-C cable, receptacle and plug. USB full-featured Type-C cable have four groups of wires: USB D+/D−, USB SuperSpeed signal pairs, sideband signal wires and power and ground wires. There is also one or two cables used as Configuration Channel (CC), which is the pull down circuit tied to. Embodiments of the present disclosure are directed toward the recognition that USB Type-C receptacles (both upstream and downstream) can also provide for extended power delivery up to 100 W.

The Power Delivery specification provides a mechanism for USB devices to provide power to one another. This includes the circumstances where one of the USB devices does not have power (e.g., a dead battery that requires charging or lost its power source). The USB Type-C Specification describes the method of signaling the basic non-USB power delivery. After a connection is established, a power source applies a pull-up resistor element to the configuration channel pin/wire (also called CC pin or CC wire). The pull-up resistor value indicates, to the power sink device on the other side of the cable, how much current the power source can provide. The power sink device can use a resistor pull-down to indicate the current sinking capabilities of the power sink device (e.g., by indicating an amount of current) so that the power source device can provide the appropriate amount of power. The value can indicate the power sourcing capabilities of the second USB device. The USB specification specifies an allowable tolerance for the resistive value of the second device, and further, allows for different tolerances for different stages of communication and connection. Aspects of the present disclosure can be particularly useful for meeting the specified tolerances for the resistive value.

Turning now to the figures, FIG. 1 depicts a block diagram of a system for communicating current sourcing capabilities between devices, consistent with embodiments of the present disclosure. A power source device 102 can be connected to a power sink device 104 by a plurality of wires 114. Although not limited thereto, the plurality of wires 114 can correspond to wires in a cable that is compliant with USB Type-C specifications, including a pair of CC wires and power ($V_{bus}$) wires). In some embodiments, the wires can be connected to an integrated circuit (IC) chip through a (USB-compliant) connector. Traces on the IC chip can connect the connector to the various circuits.

According to various embodiments, a power supply circuit 106 can generate local power (Vdd) from power that is received from the power sink device 104 over the plurality of wires 114. Other potential sources of power for power supply circuit 106 can include, but are not necessarily limited to, a local battery or similar power storage circuit, an external connection (e.g., an AC/DC converter output for a wall plugin).

Consistent with certain embodiments, the power sink device 104 can include an actively-trimmed pull-down circuit 110. This circuit can be selectively connected to a particular wire of the plurality of wires 114. For example, in the case of USB Type-C, the actively trimmed pull-down circuit can be connected to a CC wire. The use of two CC wires allows for the Type-C connector to allow for different relative orientations of the male-female connectors.

The use of active trimming in the pull-down circuit 110 can be useful for providing an accurate resistive value that is both on chip and relatively inexpensive and with a relatively small foot print on the IC chip. For a USB Type-C application, the pull-down value can be 5.1 kilo ohms with a +/−10% tolerance. According to embodiments, active trimming relies upon the presence of local power (Vdd). For example, active trimming can be accomplished using a selectable resistor ladder, such as provided in the circuit depicted in FIG. 6, which is discussed in more detail herein.

In certain embodiments, the power sink device 104 may be configured to provide a pull-down in the absence of local power. For example, the power sink device 104 may be connected to the power source device 102 when there is no local source of power (e.g., due to a dead battery and the absence of an external power source such from as an AC wall plug). In such instances, the actively-trimmed pull-down circuit 110 will not initially have stable local power (Vdd) and therefore will not provide active trimming for the resistive value of the pull-down. Various embodiments of the present disclosure are directed toward the use of an unpowered pull-down circuit 112. As used herein, the term unpowered refers to the absence of local power (Vdd) from a power supply circuit 106, which local power can be used for providing active trimming. The unpowered pull-down circuit can be used to provide a pull-down for the CC wire when the power source device 102 first provides a voltage on the CC wire (e.g., using a pull-up on the power source device side of the CC wire). Consistent with embodiments, the effective resistance of the unpowered pull-down circuit 112 can have a similar resistive value as the actively-trimmed pull-down circuit 110.

Control/enable circuit 108 can be configured to enable and disable the unpowered pull-down circuit 112 and correspondingly enable the actively-trimmed pull-down circuit 110. In this manner, the unpowered pull-down circuit 112 can be enabled until the local power (Vdd) is stable, at which time the actively-trimmed pull-down circuit 110 can be enabled. In certain embodiments, the unpowered pull-down circuit 112 has a tolerance that exceeds the tolerance of the actively-trimmed pull-down circuit 110. The power source device 102 can be configured to operate in two different modes with two different expected tolerances for the pull-down value. For example, in a first mode the power source device 102 detects the presence of a pull-down within a first broad resistive tolerance range. In response to detecting the presence, the power source device 102 can provide a power on the Vbus wire(s) according to a conservative assumption of the power sinking capabilities of the power sink device 104. This allows the power sink device 104 to generate stable local power (Vdd) without full knowledge of the power sinking capabilities. Once the actively-trimmed pull-down circuit 110 is enabled, the power source device 102 can enter a second mode in which the resistive value is detected with a narrower resistive tolerance range.

Consistent with various embodiments, the actively trimmed pull-down circuit 110 and the unpowered pull-down circuit 112 can use the same transistor technology (e.g., each can be implemented using only enhancement mode transistor technology and potentially with only NMOS). This can be particularly useful for simplifying and reducing the manufacturing costs of the IC chip upon which the circuits reside. Various embodiments also allow for the unpowered pull-down circuit 112 to function without the use of control signals that use voltages outside of the power domain of the signals received over the plurality of wires and as provided by the power supply circuit 106. For instance, the voltage domain might be 0V to 5V and the unpowered pull-down circuit 112 can be configured to respond to an enable signal that is within 0V and 5V (e.g., as opposed to using a charge pump to reach a voltage above 5V or to using a negative voltage below 0V).

Figure 2:
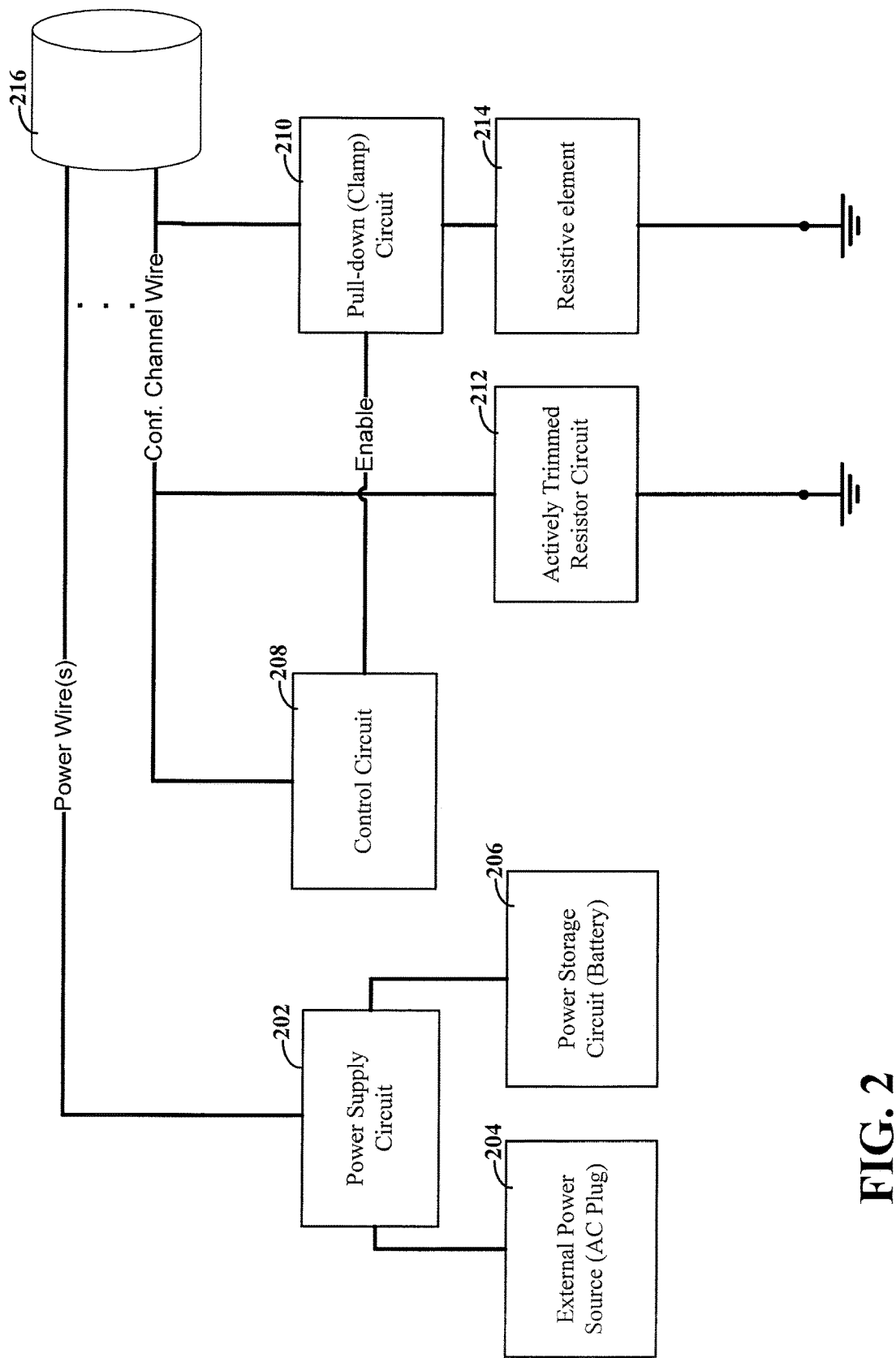
FIG. 2 depicts a block diagram of a power sink device, consistent with embodiments of the present disclosure.

FIG. 2 depicts a block diagram of a power sink device, consistent with embodiments of the present disclosure. The power sink device can be connected to a power source device via a plurality of wires 216, such as a USB cable and corresponding USB connectors. In certain embodiments, the plurality of wires can include a configuration channel wire and one or more power wires. As discussed herein, a power supply circuit 202 can be configured to generate local power from local sources that can include, but are not necessarily limited to, a power storage circuit (battery) 206, an external power source (AC/wall plug) 204, and combinations thereof. The local power can be used by various circuits of the power sink device including an actively trimmed resistor circuit 212. The actively trimmed resistor circuit 212 can be configured to provide a more precise resistive value, with tighter tolerances, relative to the precision of a resistive value provided by pull-down circuit 210 and resistive element 214.

Pull-down circuit 210 can be configured to respond to a voltage on the configuration channel wire to enable a clamping transistor that provides a conductive path to ground through the resistive element 214. In some embodiments, resistive element 214 can be a relatively cheap resistor element that has a wider tolerance than the tolerance of the actively trimmed resistor circuit 212. As used herein, a resistor element, or a resistor circuit, can include one or more discrete resistors. Control circuit 208 can be configured to enable and disable the pull-down (clamp) circuit 210 so that the resistive element 214 can be used as the pull-down during a time that the actively trimmed resistor circuit 212 is not fully operational due to the lack of stable local power from the power supply circuit 202. For instance, in the absence of power from external power source 204 and power storage circuit 206, the power supply circuit 202 will not produce local power until power is provided over the power wires. When the plurality of wires 216 are first connected between the power sink device and the power source device, the power source device may not know the current sinking capabilities of the power sink device and vice versa. Thus, the power source device can first provide a voltage on the configuration channel wire. The power sink device can communicate its power/current sinking capabilities first using pull-down circuit 210 and resistive element 214. In response, the power source device can provide power over the power wires. This power can then be used by the power supply circuit 202 to generate local power for the power sink device. The presence of stable local power can allow the power sink device to use the actively trimmed resistor circuit 212, which can provide a more precise indication of the power sinking capacities of the power sink device. Accordingly, the control circuit 208 can be configured to disable the pull-down circuit 210 in response to the presence of stable local power.

Figure 3:
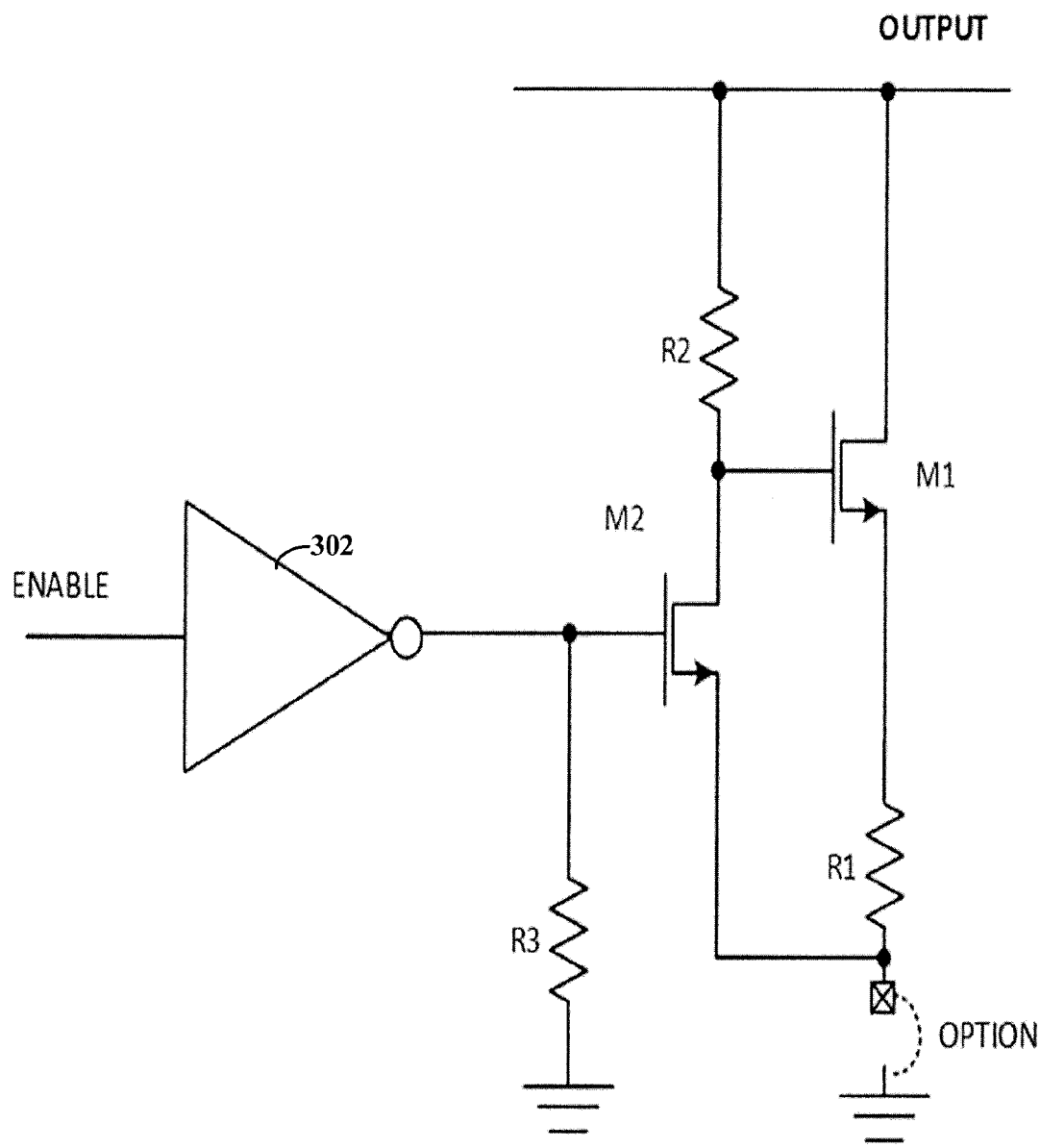
FIG. 3 depicts a circuit diagram of an unpowered pull-down circuit, consistent with embodiments of the present disclosure.

FIG. 3 depicts a circuit diagram of an unpowered pull-down circuit, consistent with embodiments of the present disclosure. The output node corresponds to a wire from the plurality of wires, such as the CC wire in USB Type-C. Enhancement mode NMOS transistor M1 is configured to be enabled/clamped in response to the presence of a positive voltage on the output node. Thus, transistor M1 is configured to be active (conducting between source and drain) when there is a positive voltage on the output node and without the need for local power. Resistor R1 provides a current-limiting function and a path to ground when transistor M1 is active. As discussed herein, resistor R1 can be implemented using relatively cheap processes due to the relaxed tolerances (relative to a separate actively-trimmed resistor circuit).

According to embodiments, when connected to a pull-up circuit in the power providing device (such as a current source) the clamping voltage of the unpowered pull-down circuit can be equal to the gate-source voltage of the clamping M1 transistor plus the voltage drop of the current limiting resistor R1. The clamping M1 transistor can be configured to work either in the saturation or subthreshold region depending on the requirements of voltage range, voltage accuracy, the physical size of the circuit, and other considerations.

Transistor M2 is configured to be active (in triode region) in response to the presence of an enable signal. When active, transistor M2 pulls the gate of transistor M1 down to ground and thereby renders transistor M1 inactive (high impedance). Resister R2 can be set to a relatively high resistive value so that the pull-down effect of an active transistor M2 is sufficiently minimal so as not to meaningfully affect the pull-down value when the actively trimmed resistor circuit is active. Thus, the leakage current of the circuit when M1 is disabled is low enough to not interfere the power communications and operations.

In some embodiments, the effective resistance of the path from the output node to ground and through R2 and M2 can be taken into consideration when configuring the resistive value of the actively trimmed resistor circuit if the leakage current cannot be made negligible for some reason. In particular, the actively trimmed resistor circuit can be configured to provide a slightly higher resistance so that the parallel resistance of the R2-M2 path results in the desired total pull-down resistance value.

Inverting buffer circuit 302 can be configured to drive the gate of M2 to a high voltage in response to an active low enable signal being provided to the input of the inverter buffer circuit 302. In various embodiments, inverter buffer circuit 302 can be powered by the local power of the sink device. Thus, transistor M2 will not be activated until the local power is presence because the inverter buffer circuit 302 will not actively drive the gate of M2 high until local power is present. Resistor R3 can be used to insure that the gate voltage remains low until actively driven by the inverter buffer circuit 302.

Consistent with certain embodiments, the optional mechanical connection depicted between R1 and ground can be used to control whether or not an unpowered pull-down circuit is to be used in the particular design. For instance, the node between R1 and ground could be routed to an external pin of package for the IC chip. The designer of a device that uses the IC chip could then decide whether or not to connect the pin to ground. If not connected, then the unpowered pull-down circuit would effectively be disabled for all conditions because the current path to ground for the pull-down would be broken. In another instance, the designer could include a mechanical switch between the pin and ground that would allow for dynamic control of this option. Other possibilities also exist, such as a fuse that can be blown to disable (or left intact to enable) the related functionality.

According to various embodiments, the strength of the pull-down (e.g., the effective resistance seen by the power providing device) can be set by selection of the resistive value for R1, the size of the transistor M1, and combinations thereof. For example, given knowledge of the voltage provided on the CC wire, the transistor M1 can be configured to operate in the saturation region. The size of the channel for the transistor M1 can be set to control the current level in the saturation region. Similarly, the size of the resistor R1 can be selected based upon this current level in order to provide the desired voltage output (e.g., between 0.25V to 2.45V for USB Type-C depends on the current mode).

Figure 4:
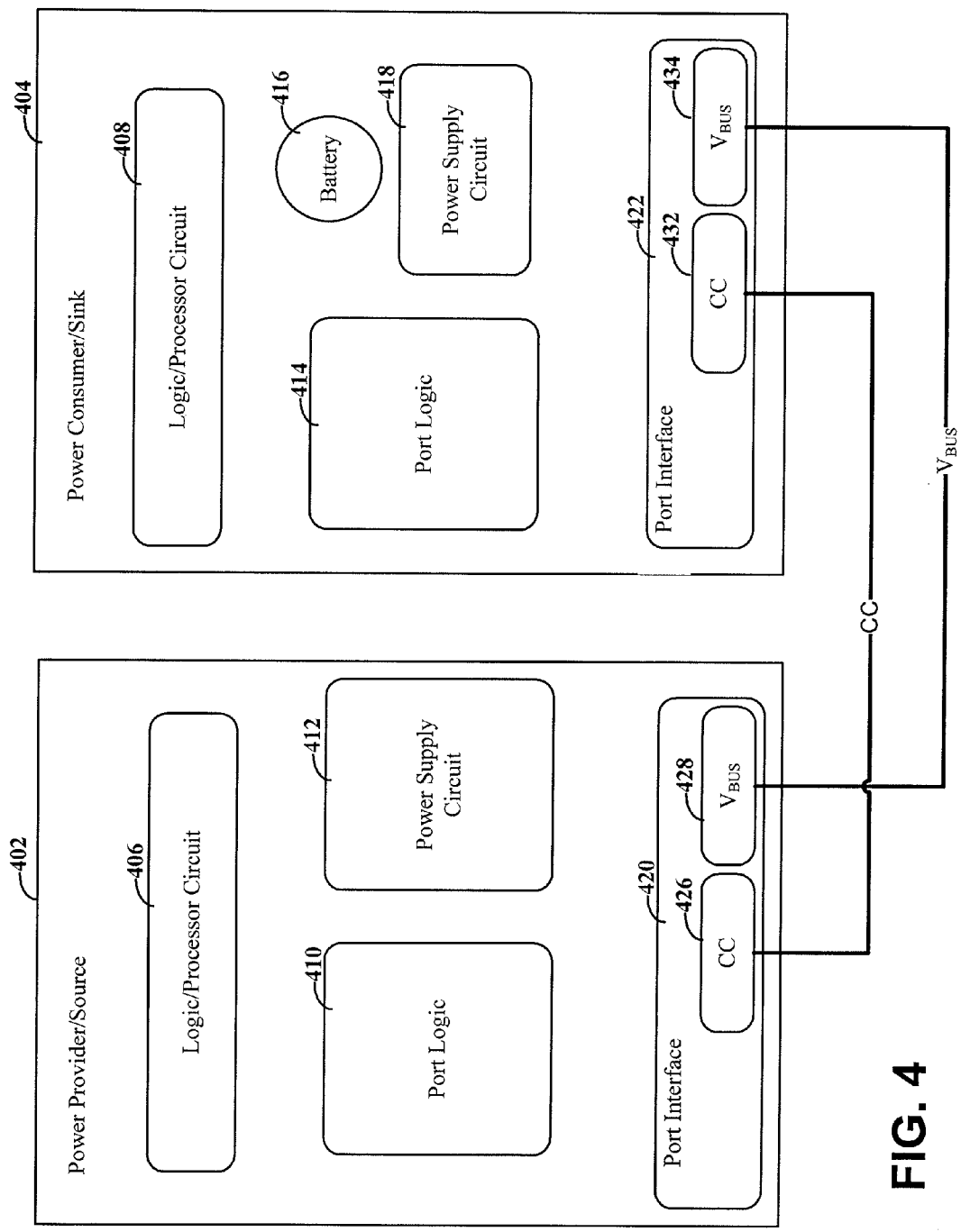
FIG. 4 depicts a block diagram for a system that includes two USB devices, consistent with embodiments of the present disclosure.

FIG. 4 depicts a block diagram for system that includes two USB devices, consistent with embodiments of the present disclosure. According to embodiments, power provider/source device 402 can be configured to interface with a power consumer/sink device 404 using a USB Type-C interface. Depending upon the complexity of the respective devices, they can each include logic/processor circuits 406 and 408 that are configured to provide various processing and control functions. For example, the processing circuits 406 and 408 can be configured to run an operating system, software drivers, various software applications and combinations thereof. Power supply circuits 412 and 418 can be configured to generate local power to the various circuits in the respective devices. For example, they can each be configured to provide voltage regulation of power provided from sources such as an external power port or a battery 416.

According to embodiments, port logic 410 and 414 can be configured to provide low level control for USB functionality. This can include, for example, implementing power delivery policies and related communications. Port interfaces 420 and 422 can include USB connectors that are designed to allow for connection to a variety of different USB capable devices using an appropriate USB cable. The port interfaces can be designed to communicate and provide power using connection ports 426, 428, 432 and 434. These connection ports can be connected over a plurality of wires that include CC and Vbus wires, which are used in connection with USB Type-C.

As discussed herein, various embodiments allow for the CC connection to be pull-downed by the power sink device 404 in the absence of local power from power supply circuit 418 (e.g., due to a dead battery 416). Moreover, this pull-down function can be carried out without the use of depletion-mode MOSFETs and without using charge pumps or negative voltages to drive MOSFETs used to provide the pull-down function.

Figure 5:
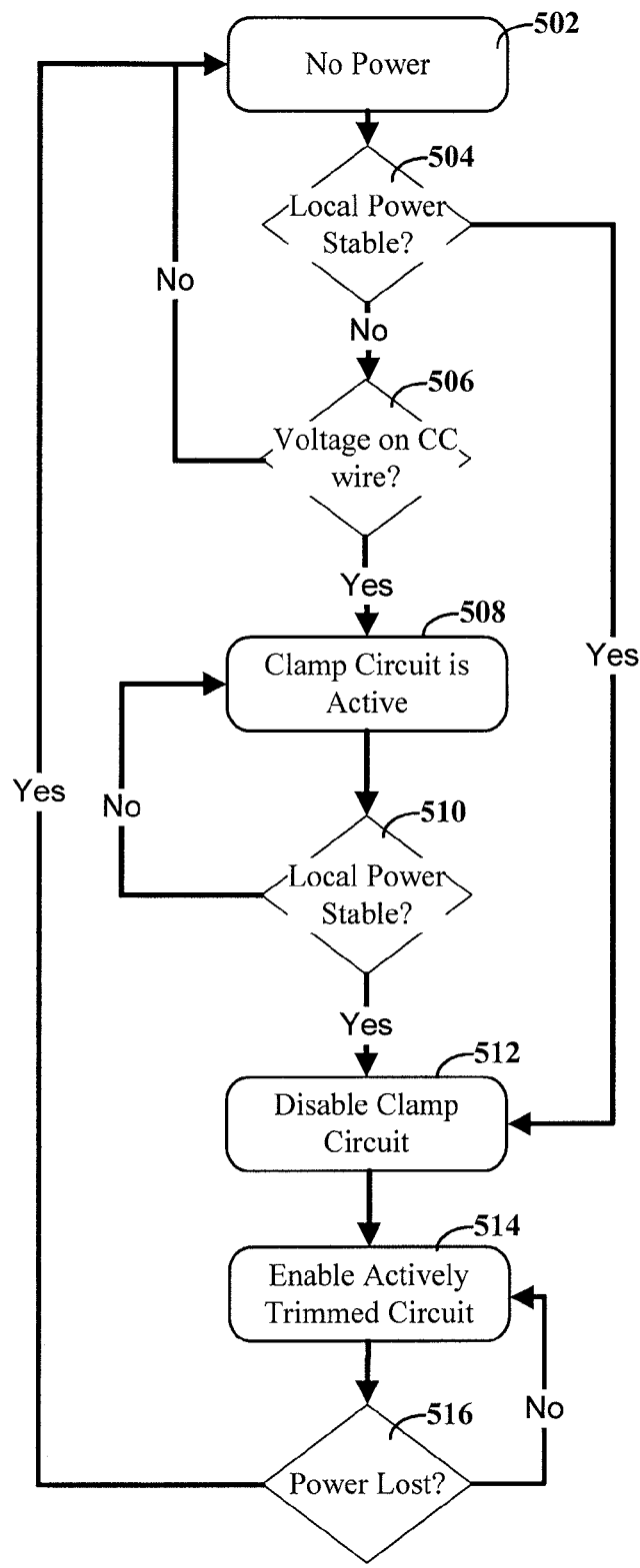
FIG. 5 depicts a flow diagram for use with a system for communicating current sourcing capabilities between devices, consistent with embodiments of the present disclosure.

FIG. 5 depicts a flow diagram for use with a system for communicating current sourcing capabilities between devices, consistent with embodiments of the present disclosure. Block 502 represents a state where the power sink device has no power. The power sink device can be configured to detect the presence of stable power per block 504. If stable power is present, then the power sink device can disable the unpowered clamp/pull-down circuit per block 512 and begin using the actively trimmed circuit per block 514. If stable power is not present, then it is still possible that an external connection to a power source device has been established, as would be indicated by the presence of a voltage on the CC wire. Per block 506, if no voltage is present on the CC wire, then the no power state 502 remains valid.

If there is a voltage on the CC wire, but no stable power, then the clamp circuit can become active to pull down the CC wire, per block 508. The presence of the pull-down can prompt the power providing device to begin providing power over power wires (Vbus). Until this power is available and the local power supply circuit has generated stable local power therefrom, the clamp circuit can remain active per block 510. Once local power is present, the power sink device can generate an enable signal that disables the clamp circuit per block 512. At this point the actively trimmed resistive circuit can be used, per block 514. If local power remains available, the power sink device can remain in this state as indicated by block 516. Otherwise, the power sink device can return to the power lost condition indicated by block 502.

Figure 6:
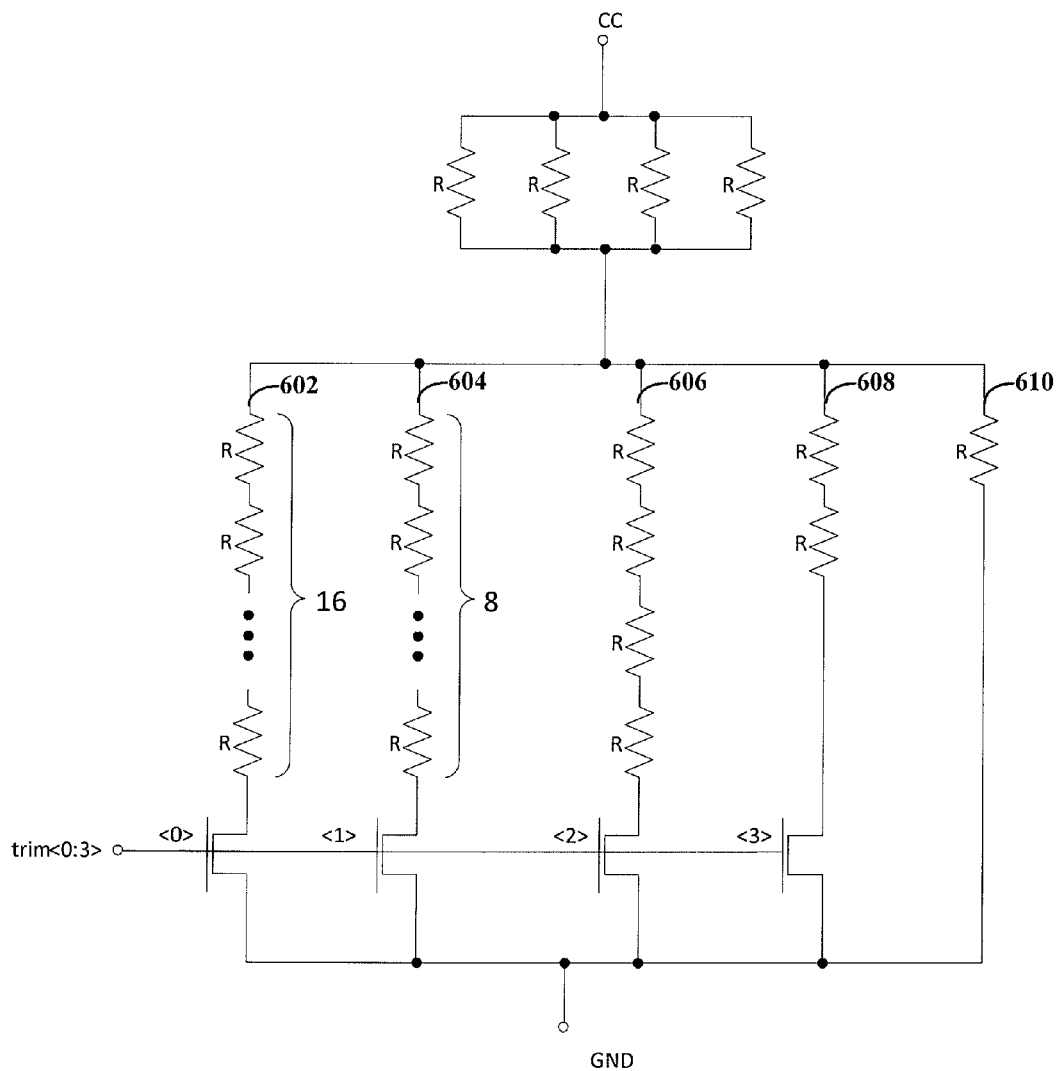
FIG. 6 shows a resistor circuit that is configured for active trimming, consistent with embodiments of the present disclosure.

FIG. 6 shows an actively-trimmed resistor circuit, consistent with embodiments of the present disclosure. The circuit shown in FIG. 6 receives a 4 bit trimming control signal (trim<0:3>) and each bit of the control signal controls a corresponding transistor. By enabling and disabling the transistors, the effective resistance of the resistors in the corresponding path (602-608) can be added or removed from the total resistance of the trimming resistor circuit. For example, assuming all resistors have the same resistance value of R, the resistance of each path is: 602=16R, 604=8R, 606=4R, 608=2R and 610=R. Various combinations of these paths can be selected in order to arrive at the desired resistance. In some instances, the total resistance can be set during a calibration/trimming process to set the resistance as close to the desired/ideal resistance as possible. This can be useful in situations where the tolerances of the resistors may be relatively large, and thus can vary from device to device.

The particular circuit depicted in FIG. 6 is a non-limiting example. Other configurations and types of actively-trimmed resistive circuits can also be used.

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, an apparatus can be designed for use with different protocols and configurations than illustrated by the various figures. Such modifications do not depart from the true spirit and scope of various aspects of the disclosure, including aspects set forth in the claims.

What is claimed is:

1. A system comprising:
   a device configured to communicate current sourcing capabilities to an external power source over a wired connection containing a plurality of wires, the device including:
   a power supply circuit configured to provide operating power for the device;
   a powered pull-down circuit configured to provide a pull-down for a particular wire of the wired connection using a first resistive element that is actively trimmed using the operating power; and
   an unpowered pull-down circuit comprising a transistor that, in the absence of the operating power, is configured to enable a current path, in response to a gate voltage generated from a voltage on the particular wire, between the particular wire and a second resistive element, and a clamping transistor configured to be active without the operating power.

2. The system of claim 1, wherein the unpowered pull-down circuit is configured to disable the pull-down of the particular wire using the second resistive element in response to an enable signal that is generated using the operating power, and first resistive circuit and the second resistive element each includes at least one discrete element.

3. The system of claim 2, further comprising:
   a control circuit configured to detect a presence of operating power and to generate, in response to detecting the presence of operating power, the enable signal.

4. The system of claim 1, wherein the power supply circuit is configured to generate the operating power from a battery of the device.

5. The system of claim 4, wherein the power supply circuit is configured to use power provided by the external power source to charge the battery and generate the operating power.

6. The system of claim 1, wherein the particular wire is connected to a type-C configuration channel pin of a universal serial bus (USB) connector.

7. The system of claim 1, wherein the first resistive element has a first resistive value tolerance and the second resistive element has a second resistive value tolerance that is greater than the first tolerance.

8. The system of claim 1, wherein at least one transistor is an enhancement-mode NMOS transistor.

9. The system of claim 8, further comprising:
   a resistor connecting the gate of the at least one transistor to ground.

10. A method for communicating current sourcing capabilities of an upstream facing device to a downstream facing device that provides external power over a wired connection containing a plurality of wires, the method comprising:
    receiving a voltage over a particular wire of the wired connection;
    enabling a transistor of an unpowered pull-down circuit, in response to a gate voltage of the transistor that is generated from the voltage over the particular wire, to pull down the particular wire using a first resistive element, wherein the transistor is coupled to a clamping transistor configured to be active without the operating power;
    disabling, in response to a presence of power from a power supply circuit of the upstream facing device, the unpowered pull-down circuit; and
    enabling, in response to the presence of power from the power supply circuit of the upstream facing device, a powered pull-down circuit that uses a second resistive element that is actively trimmed using the power from the power supply circuit.

11. The method of claim 10, further comprising:
    receiving the external power from the downstream facing device over another wire of the plurality of wires.

12. The method of claim 11, further comprising:
    charging a battery of the upstream facing device using the external power.

13. The method of claim 11, further comprising:
generating the power from the power supply circuit using the external power.

14. The method of claim 10, wherein the wired connection is part of a universal serial bus (USB) connection.

15. The method of claim 14, wherein the particular wire is connected to a type-C configuration channel pin of the (USB) connection.

16. A device comprising:
a wired connector including a plurality of pins;
a power supply circuit configured to provide operating power for the device;
a powered pull-down circuit configured to pull down a particular wire of the wired connection using a first resistive element that is connected to a pull-down voltage and that is actively trimmed using the operating power; and
an unpowered pull-down circuit including: a first transistor having a source and a gate tied to the particular wire and drain, a clamping transistor configured to be active without the operating power, a second resistive element connected between the drain of the first transistor and a pull-down voltage, and a second transistor configured to disable the first transistor in response to an enable signal.

17. The device of claim 16, further comprising:
a resistor connected between a source of the second transistor and the particular wire.

18. The device of claim 17, wherein the drain of the second transistor is connected to the pull-down voltage.

19. The device of claim 16, further comprising:
a resistor connected between a gate of the second transistor and ground.

* * * * *